Nov. 9, 1965 W. R. SPENCER ETAL 3,216,258
TEMPERATURE MEASURING DEVICE
Filed Sept. 22, 1961 2 Sheets-Sheet 1

INVENTORS.
WILLIAM R. SPENCER
WILLIAM J. BEITTEL
ALBERT D. SANDERS
BY Gerald L. Moore
ATTORNEY-

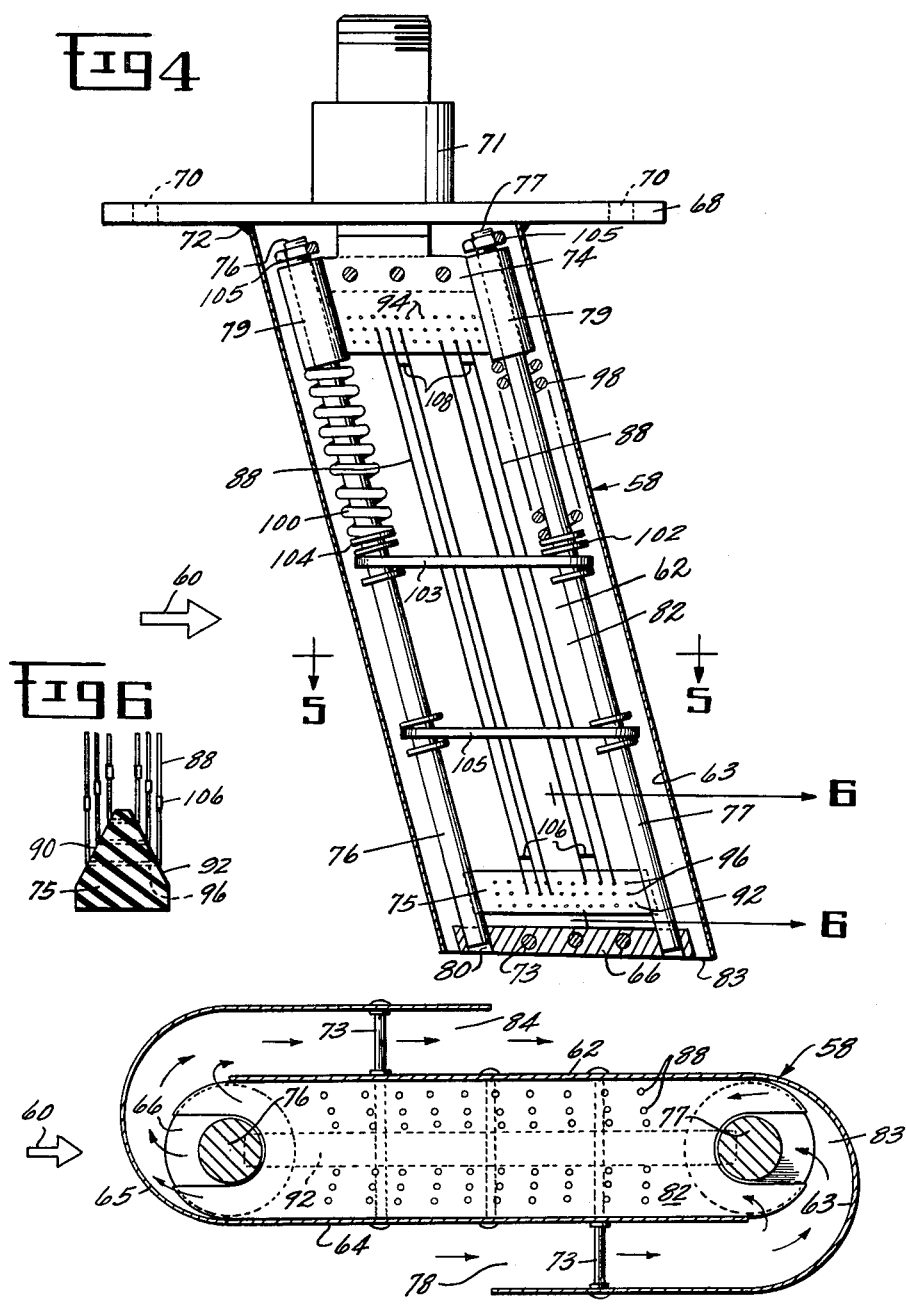

United States Patent Office 3,216,258
Patented Nov. 9, 1965

3,216,258
TEMPERATURE MEASURING DEVICE
William Ralph Spencer, Cincinnati, Ohio, William J. Beittel, Camillus, N.Y., and Albert Douglas Sanders, Owensboro, Ky., assignors to General Electric Company, a corporation of New York
Filed Sept. 22, 1961, Ser. No. 139,978
8 Claims. (Cl. 73—349)

This invention relates to a temperature sensor for use in turbine engines and other applications to measure the temperature of a gas in motion.

In modern turbomachinery as in many other applications, it is necessary to accurately measure the temperature of moving gases. The temperature desired to be measured is the total temperature of the gas, or that temperature corresponding to the temperature of the gas if it were motionless. However, in most temperature sensors presently in use for measuring the temperatures of moving gases, the temperature indicated is the static temperature plus some fraction of the temperature difference between the static temperature and the total temperature of the gas, the static temperature being that temperature indicated by a sensor moving in the gas stream at the same velocity as the gas. Naturally, because the difference between the static temperature and the total temperature increases with the velocity of the gas, the errors encountered in total temperature measurement are magnified because of the high gas velocities often found in present day turbomachinery.

Also encountered are other difficulties resulting in errors in indication such as those caused by the aerodynamic loading on the temperature sensor by the fast flowing gases. Also, foreign material entrained in such fast flowing gas streams frequently cause error in the temperature indication and may result in serious damage to the sensor.

It is therefore one object of my invention to provide a temperature measuring device which will minimize the error in indicating the total temperature of a moving gas stream.

It is another object of my invention to provide a simple temperature measuring means which is shielded to prevent errors caused by aerodynamic loading yet is quickly responsive to temperature changes of the gas.

It is a further object of my invention to provide a temperature sensor which protects the temperature measuring means from damage by foreign matter in the gas stream and which incorporates simplicity of design and assembly.

In accordance with one modification of my invention, I provide a temperature sensor apparatus for use in a continuously moving gas stream comprising wall means defining a housing which is located within the gas stream and into which a portion of the gas enters through a primary inlet in the housing and contacts temperature measuring means located in a chamber in the housing, the gas thereafter being exhausted back into the main gas stream. The housing also incorporates wall or baffle means at the inlet to cause the portions of the main gas stream entering the housing gas to turn abruptly before entering the measuring chamber through a secondary inlet, thereby deflecting any foreign particles to thus prevent their damaging the temperature measuring means, further means also being provided to trap and exhaust into the main gas stream any foreign particles so deflected. Further, the flow conduit defined by the housing wall means is enlarged in flow area at the point at which the temperature measuring means is located, and this enlargement decreases the gas velocity adjacent the temperature measuring means thereby allowing it to more accurately indicate the total temperature of the gas. The reduction of the gas velocity also reduces the aerodynamic loading on the temperature sensing means and thereby further increases the temperature measuring accuracy of the device.

The subject matter which is regarded as the invention is particularly pointed out and distinctly claimed in the concluding portion of the specification. The invention, however, both as to organization and method of operation, together with further objects and advantages thereof may best be understood by reference to the following description taken in connection with the accompanying drawings, in which:

FIGURE 4 is a side cutaway view of another embodiment of the invention,

FIGURE 5 is an enlarged cross-sectional view taken along the line 5—5 of FIGURE 4, and FIGURE 6 is an enlarged cross-sectional view taken along the line 6—6 of FIGURE 4.

Figure 1:
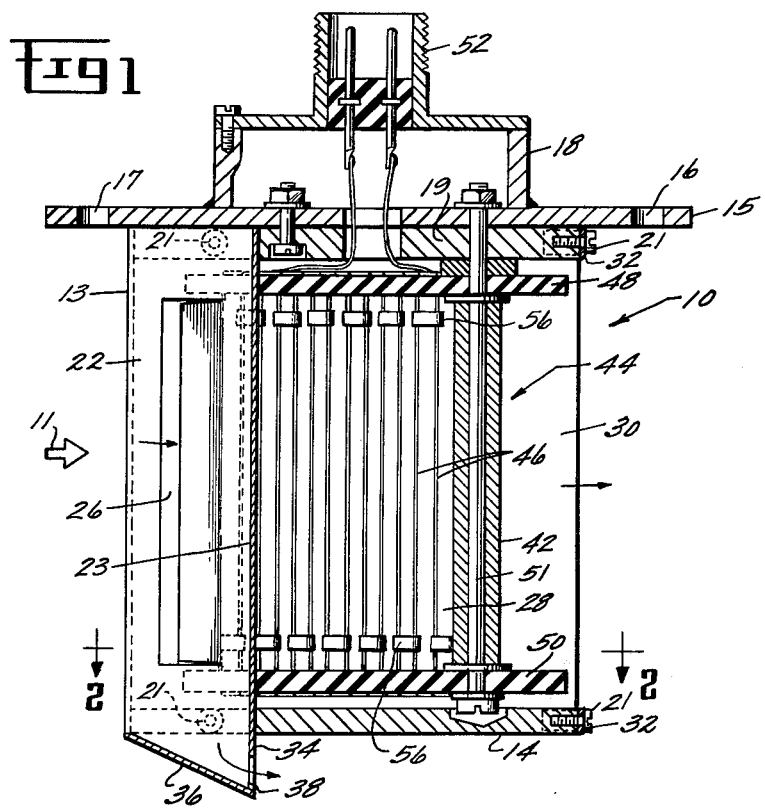
FIGURE 1 is a side view partially in section of one embodiment of the invention.

Referring now to FIGURE 1, therein is shown one embodiment of the invention including a housing 10 which is located within a gas flow stream flowing in the direction indicated by the large arrow 11. The housing includes side walls 12 and 13 which may be formed from a single sheet of metal or other suitable material bent to the elongated tubular configuration shown, and end walls 14 and 15 closing the lower and upper ends of the generally tubular housing thus formed. End wall 15 is extended to form a flange which may be mounted to abut a wall of the conduit (not shown) through which the gas is flowing and may be held in place by suitable means such as bolt fasteners (not shown) passing through the mounting holes 16 and 17 provided for that purpose. A suitable opening in the wall of the conduit must be provided to enable either the sensor unit or its housing portion 18 to extend through the conduit wall, this housing portion 18 being provided for enclosing an electrical connector as will be explained later.

The housing portion 18 is fastened to the end wall 15 as by welding while a support plate 19 is fastened to the opposite side of end wall 15; the purpose of this support plate will be explained in detail later. Fastener means such as screw fasteners 21 are used to assemble the side walls 12 and 13 to the end wall 14 and to the support plate 19.

Figure 2:
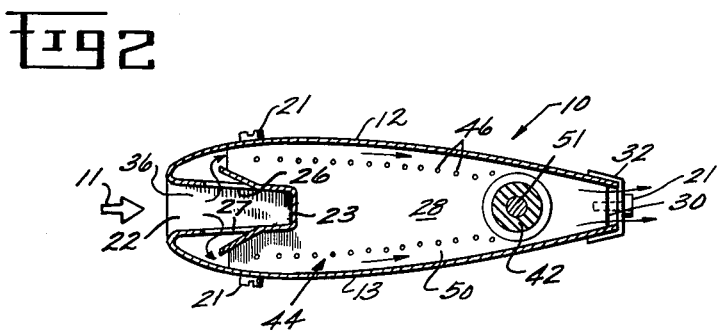
FIGURE 2 is a cross-sectional view taken along the line 2—2 in FIGURE 1.

Referring now also to FIGURE 2, the housing or first wall means 10 is streamlined to present a small aerodynamic profile to the gas stream 11. The housing is provided with a large or primary gas inlet 22 facing upstream of the gas flow. A portion of the moving gas stream, the temperature of which is to be measured, enters the inlet 22 as indicated by the small arrows. Inside the housing, and opposite the primary gas inlet 22, is a second, generally U-shaped (in cross-section) wall means including a baffle portion 23 located directly in the path of the portion of the gas flow entering inlet 22 which causes an abrupt change in direction of the gas flow as it enters the housing. Secondary openings 26 and 27 are provided in at least one side of the second wall means leading into the interior of the housing 10. The openings 26 and 27 lead into a measuring chamber or area 28 within the housing 10 which is of a greater flow area than that of either the gas inlet 22 or the openings 26 and 27, to thus substantially reduce the velocity of gas flow within the measuring chamber. To the rear or on the downstream end of the housing 10 is a primary gas outlet 30 for subsequently exhausting the gas from the housing 10 as indicated by the small arrows. The latter opening, as well as openings 26 and 27, may extend substantially the total length of the housing 10 and at its opposite ends opening 30 may be spanned by strengthening members 32 fixed as by spot-welding to the side walls 12–13 and bolted to the end wall 14 and support plate 15 to strengthen the housing.

Referring to the wall portion 23, this extends the entire length of the gas inlet 22 and downwardly through the lower end wall 14 of the housing as indicated at 34. Below end wall portion 14, the wall 23 joins with a shield wall 36 which conveniently may be formed integrally with one or both the wall members 12 and 13. The extension 34 of wall portion 23 and wall 36 together form a trap chamber at the lower end of which is located a hole 38 for escape of foreign matter entrained in the gas stream and deflected into the trap chamber as more fully explained hereinafter.

Figure 3:
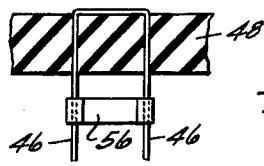
FIGURE 3 is a detailed view of the support means for the temperature indicator wires showing the shunt means.

Within the measuring chamber 28 is located the temperature sensor means to be employed. In the embodiment shown, a resistance temperature sensing means 44 is illustrated; however, it should be understood that other temperature sensing means, for instance, thermocouples, may be employed if more appropriate to the particular application. The resistance temperature sensor 44 comprises a series of electrically conductive wires 46 having a high coefficient of resistance change with temperature and disposed within the measuring chamber 28 so as to be exposed to the gas passing through this flow area. The wires 46 extend between support members 48 and 50 which are mounted in spaced relationship on bolt 51 extending from the end wall 15. The manner of supporting these wires is illustrated in FIG. 3 showing the wire 46 extending through holes in the support 48. The wire segments 46 extending between the support members 48 and 50 are in series circuit with each other and are electrically connected to the terminals of a cable connector 52 (attached to the housing portion 18).

As will be obvious to those skilled in the art, the resistance of wires 46 will change with a change of their temperature; also, the temperature of the wires closely approximates the temperature of the gas flowing through the measuring chamber 28 because they are in intimate contact therewith. A correlation is thus obtained between the temperature of the wires, and therefore the temperature of the gas, and the resistance of the wire thus enabling the temperature of the gas passing through the device to be measured as a function of the wire resistance.

To increase the speed of response of the temperature sensor, those portions of the wires 46 extending into the support members 48 and 50 preferably are electrically shunted out of the circuit by the shunt members 56 (see FIGURE 3) since that portion of the wire is relatively slow in responding to changes of gas temperature. The reason for this slower response is that these wire portions at the supports 48 and 50 are outside the main stream of the gas flow and also because of the relatively large thermal capacity of the supports 48 and 50 which they contact. These shunt members 56 may, if desired, be slidably connected to the wire members 46 and utilized to adjust within certain limits the overall resistance of the wire in the resistance temperature sensor circuit by moving the shunt members along the wires with respect to the support members so as to either increase or reduce the effective length of the wires 46 in the temperature sensor circuit. After the optimum resistance for the circuit has been obtained, the shunt members 56 may then be permanently secured in position by soldering, crimping or the like to prevent their movement during subsequent operation of the temperature measuring means.

In operation, the housing assembly 10 is located within the gas flow stream 11 and a portion of the gas enters the gas inlet 22 as indicated by the small arrows, and directly encounters the baffle or wall means 23. Upon striking the wall means 23 the gas is forced to abruptly change direction and flow either through the opening 26 or the opening 27 and subsequently into the measuring chamber 28. Often, this gas may carry foreign particles which if allowed to reach the temperature detecting means might result in damage thereto; however, when the gas is forced to make this abrupt change in direction, any foreign particles entrained in the gas stream strike the wall means 23 and subsequently fall out of the gas stream downwardly along the wall means 23 and into the shield member 36. Gas also flows into this shield member from the normal gas stream and exhausts through the opening 38 to carry any foreign particles away from the temperature measuring means.

As the gas enters the measuring chamber 28 through slots 26 and 27, the flow area is considerably enlarged thereby causing the gas velocity to decrease substantially, allowing the gas to pass relatively slowly past the wires 46. The wires 46 therefore remain at substantially the same temperature as this gas and are connected to suitable temperature indicating or control means through the connector 52. The gas exhausts from measuring chamber 28 through the gas outlet 30, to be discharged back into the main gas flow stream.

In FIGURES 4 and 5 is illustrated another embodiment of the invention comprising a housing 58 which is located in a gas flow stream with the direction of gas flow indicated by the large arrow 60. The housing consists of side wall members 62 and 64 which are bent as shown to form in addition the front and rear walls of the housing, with the end wall or baffle means 63 in this instance, being formed as an integral part of the side wall 62 and the end wall 65 formed as an integral part of the side wall 64. A bottom wall 66 closes the lower end of the housing while mounting flange 68 closes the opposite end and serves to support the assembly at an angle from a wall of the gas conduit (not shown) by appropriate fastening means extending through the mounting holes 70 provided in the mounting flange. Side walls 62 and 64 are brazed or otherwise suitably secured to mounting flange 68 as at 72, and fastener means such as rivets 73 hold the end walls 63 and 65 in assembled relationship with the side walls as shown. A housing portion 71 extends outside the gas conduit to allow the necessary electrical connections to be made as explained before.

A gas inlet 78 is provided to allow the gas to flow into the housing 58 in its normal direction of travel; subsequently, the gas passes through the measuring chamber 82 and is discharged through the gas outlet 84. The specific configuration of the housing and the location of the inlet and outlet reduces the aerodynamic loading on the housing and also allows the gas to flow by its own momentum into the inlet 78 and subsequently be discharged in its original direction of travel through the outlet 84, where an ejector effect is created by the main gas passage past this exit to assist in discharging the gas from the housing. Also, the slanting of housing 58 in the direction of the gas flow lowers the aerodynamic drag forces on the housing and in addition, decreases the possibility of any foreign matter hanging or catching on the housing itself.

A resistance temperature sensor is illustrated as utilized in this embodiment, however, as in the prior embodiment, it should be understood that other temperature sensing means may be employed if preferred. The temperature sensor means comprises support members 74 and 75 mounted at opposite ends of the housing 58, with the upper support member 74 being fixed to mounting flange 68 as shown, and the lower support member 75 being fixed between two rod members 76 and 77 adjacent their lower ends. These rod members 76 and 77 are supported from member 74 by the sleeves 79 formed integrally with the member 74. Support members 74 and 75 are formed of a dielectric material for both supporting and electrically insulating resistance wires 88 of the temperature sensor means and as shown in FIGURE 6, include tapered portions 90 and 92 so that the resistance wires 88 passing through mounting holes 94 and 96 may be situated in "tiers" or layers so that they are sufficiently separated to prevent contact with each other. In this manner, more resistance wires may be supported within the flow area 82 to allow for a more accurate indication of the gas temperature.

The support member 75 and the rod members 76 and 77 by which it is supported are spring biased with respect to the support member 74 by the springs 98 and 100 exerting a separating force between the support 74 and the fixed sections 102 and 104 on the threaded members. The rod members are maintained in their spaced relationship by the spacer members 103 and 105. By this assembly when the resistance wires 88 are threaded between the support members, a definite tension may be incorporated in the wires by this spring tension so as to maintain these wires at a given tension and decrease any possibility of errors in temperature indication because of change in tension of the wires which might be caused by changes in the aerodynamic loading or vibration of the housing as well as thermal expansion of the housing and support members. Limited movement of the support member 75 within the housing is allowed since the openings 80 allow the rod members 76 and 77 to move longitinally with respect to the bottom wall 66.

After the wire is threaded through the mounting holes 94 and 96 is the normal way, that portion of the wire actually supported within the mounting holes may be shunted out of the electrical circuit by the shunt members 106 and 108 to increase the accuracy of temperature measurement as explained in connection with the previous embodiment.

In operation of this embodiment, a portion of the gas flow enters the gas inlet 78 and subsequently flows past the temperature sensitive resistance wires 88 located within the measuring chamber 82, then discharges through the gas outlet 84. This flow is assisted by impact pressure at the inlet 78 and by ejector action at outlet 84. In generally the same manner as discussed in connection with the FIGURE 1 embodiment of the invention, any foreign matter carried by the gas entering through the gas inlet 78 strikes the housing baffle portion or wall means 63, due to the abrupt change in the flow direction of the gas, and is deflected downwardly to be discharged through the opening 83. In addition, the flow area within the measuring chamber 82 is substantially larger than the flow area of the gas inlet 78 so that the gas velocity is substantially decreased to allow intimate contact with the temperature detecting wires 88.

While herein has been illustrated and described particular embodiments of this invention, other modifications thereof will occur to those skilled in the art. It should be understood therefore, that this invention is not to be limited to the particular arrangement disclosed and it is intended in the appended claims to cover all modifications which do not depart from the spirit and scope of this invention.

What is claimed is:

1. Temperature measuring apparatus for use in a continuously-moving, axial-flow gas stream comprising:
   first wall means defining an elongated generally tubular housing positioned in said gas stream and containing a measuring chamber, a forwardly-directed primary gas stream inlet opening, and a rearwardly-directed primary gas stream exit opening, said inlet opening, said measuring chamber and said primary exit opening being in serial flow relation with both of said openings extending generally co-extensively of the length of said housing; gas stream temperature sensing means rigidly supported within said measuring chamber;
   second wall means located between said temperature sensing means and said primary inlet opening, said second wall means having a baffle portion and defining a flow passage connecting said primary inlet opening with said measuring chamber through at least one secondary inlet opening, said second wall means requiring at least one abrupt change in the direction of flow of the portion of the axial-flow gas stream entering said housing through said primary inlet opening whereby foreign particles entrained in said portion of said gas stream may be separated therefrom prior to reaching said temperature sensing means; and
   means to trap any such particles and exhaust said particles from said temperature measuring apparatus.

2. Temperature measuring apparatus for use in a continuously-moving, axial-flow gas stream comprising:
   wall means defining an elongated generally tubular housing extending transversely of said gas stream having a forwardly-directed primary gas stream inlet opening, a baffle, at least one secondary inlet opening associated with said baffle, a measuring chamber in said housing, and a rearwardly-directed primary gas stream exit opening, said primary inlet opening, said baffle, said secondary inlet opening, said measuring chamber, and said primary exit opening being in serial flow relation, said baffle requiring an abrupt change in the direction of flow of the portion of said gas stream entering said housing through said primary inlet opening whereby foreign matter entrained in said portion of said gas stream may be separated therefrom prior to entering said measuring chamber through said secondary inlet opening;
   gas stream temperature sensing means rigidly supported in said measuring chamber; and
   means to trap any of said foreign matter so separated and to exhaust same from said housing.

3. A temperature measuring instrument for use in a continuously-moving gas stream comprising:
   an elongated housing extending transversely of said gas stream including spaced side walls defining an upstream primary inlet opening and an end wall joining said side walls at the downstream edges thereof and including a primary exit opening, said housing defining a measurement chamber;
   wall means generally U-shaped in cross-section joining said side walls at the upstream edges thereof and including a baffle portion directly in the path of the portion of said gas stream entering said housing at said primary inlet opening, said baffle portion abruptly changing the direction of flow of said gas stream portion and deflecting foreign particles entrained therein, prior to said portion of said gas stream entering said measurement chamber through at least one secondary inlet opening in said U-shaped wall means;
   means located in said measurement chamber and acted upon by said portion of said gas stream entering said chamber through said secondary inlet opening for determining the temperature of said gas stream; and
   means to trap and exhaust from said housing any of said foreign particles so deflected.

4. The apparatus as described in claim 3 wherein said means for determining the gas stream temperature includes at least one wire supported within said measurement chamber whereby the resistance of said wire as affected by said gas stream portion acting thereon may be measured to indicate the temperature of the gas stream.

5. The apparatus as described in claim 3 wherein said means to trap foreign particles entrained in that portion of the gas stream entering the primary inlet opening of said transversely-extending housing includes an extension of said baffle portion inwardly of the end of the housing portion containing said measurement chamber and a similar extension of at least one of said housing side walls, whereby foreign particles so deflected are trapped in the area between said extensions, thereafter being exhausted back into the gas stream through a secondary rearwardly-directed exit opening in said baffle extension.

6. The apparatus as described in claim 3 wherein said means for determining the gas stream temperature includes a pair of electrically non-conductive support members spaced longitudinally of said elongated housing, a conductor rigidly strung between said support members in a back and forth relationship to form at least one grid of parallel, equally spaced conductor portions, adjacent conductor portions being electrically connected by shunt means located closely adjacent said support members.

7. The apparatus as described in claim 6 wherein said primary inlet and exit openings and said secondary inlet opening each extend substantially the entire length of said transversely-extending housing and said side walls are spaced farthest apart in the area of said grid to provide more accurate temperature measurement of the gas stream.

8. A temperature measuring instrument for a main gas flow comprising a housing having wall means, a first wall means forming one side of said housing and being curved at the downstream side of said housing to form the downstream wall of said housing and an inlet into said housing, a second wall means forming the opposite side of said housing and being curved on the upstream side of said housing to form the upstream wall and an outlet from said housing, a flow chamber connecting said inlet and outlet, a temperature sensor in said flow chamber, whereby gas is allowed to flow into said inlet, turn abruptly to separate any foreign particles from said gas and flow through said flow chamber to thereafter be discharged from said housing through said outlet, with an opening in said housing adjacent said first wall connecting with said main gas flow such that any such foreign particles may be exhausted back into said main gas flow.

References Cited by the Examiner
UNITED STATES PATENTS

| | | | |
|---|---|---|---|
| 1,867,325 | 7/32 | Neville. | |
| 2,208,647 | 7/40 | Sanders et al. | 55—434 X |
| 2,571,422 | 10/51 | Cole | 73—362 X |
| 2,750,798 | 6/56 | Ruskin | 73—349 X |
| 2,786,354 | 3/57 | Martin | 73—204 |
| 2,942,472 | 6/60 | Harney | 73—349 |
| 2,970,475 | 2/61 | Werner | 73—204 X |
| 3,000,213 | 9/61 | Eves | 73—349 |
| 3,016,745 | 1/62 | Simon | 73—359 X |

FOREIGN PATENTS

| | | |
|---|---|---|
| 298,343 | 10/28 | Great Britain. |

ISAAC LISANN, *Primary Examiner.*